United States Patent [19]

Chang et al.

[11] Patent Number: 5,228,546

[45] Date of Patent: Jul. 20, 1993

[54] SOFT GUSSET, HARD-PANELED LUGGAGE AND METHOD OF MANUFACTURE

[76] Inventors: S. J. Chang, 13-3 Sanjung-Dong Joon-Ku, Burchum City, Kyunggi-Do, Rep. of Korea; Joseph J. Berman, 55 Mountain View Ter., Hillsdale, N.J. 07642

[21] Appl. No.: 764,794

[22] Filed: Sep. 24, 1991

Related U.S. Application Data

[63] Continuation-in-part of Ser. No. 702,950, May 20, 1991.

[30] Foreign Application Priority Data

May 7, 1991 [KR] Rep. of Korea .............. 917382

[51] Int. Cl.$^5$ .................... A45C 3/00; A45C 5/14; A45C 7/00; A45C 13/04
[52] U.S. Cl. ................... 190/18 A; 190/103; 190/115; 190/122; 190/125; 190/126; 190/127; 190/903; 383/2
[58] Field of Search ................. 190/103–105, 190/107, 125, 110, 127, 21, 126, 902, 18 A, 122, 903, 115; 383/2; 280/37

[56] References Cited

U.S. PATENT DOCUMENTS

| | | | |
|---|---|---|---|
| 21,384 | 8/1858 | Timby | 190/103 |
| 249,092 | 11/1881 | Protzen | 190/103 |
| 1,045,390 | 11/1912 | Goldsmith | 190/103 |
| 1,171,678 | 2/1916 | Trotter | 190/110 |
| 1,712,448 | 5/1929 | Eckhardt | 190/103 |
| 1,889,765 | 12/1932 | Switkes | 190/110 |
| 2,002,878 | 5/1935 | Belber | 190/103 |
| 2,536,169 | 1/1951 | Gray | 190/103 |
| 2,539,051 | 1/1951 | Benenfeld | 190/902 X |
| 2,621,139 | 12/1952 | Messing | 154/106 |
| 2,705,690 | 4/1955 | Nelson et al. | 117/138.8 |
| 2,723,962 | 11/1955 | Hedges et al. | 260/22 |
| 2,907,420 | 10/1959 | Doppelt | 190/103 |
| 3,061,057 | 10/1962 | Miller | 190/110 |
| 3,321,053 | 5/1967 | Doppelt | 190/104 |
| 3,443,671 | 5/1969 | Dyke | 190/110 |
| 3,544,418 | 12/1970 | Holtzman | 190/125 X |
| 3,660,218 | 5/1972 | Shepherd et al. | 161/87 |
| 4,437,549 | 3/1984 | Gibbs | 190/126 X |
| 4,589,530 | 5/1986 | Sher | 190/103 X |
| 4,773,515 | 9/1988 | Kotkins, Jr. | 190/103 |
| 4,784,248 | 11/1988 | Workman | 190/126 |
| 4,894,280 | 1/1990 | Guthrie et al. | 428/224 |
| 4,953,673 | 9/1990 | Ambasz | 383/2 X |
| 5,004,091 | 4/1991 | Natho et al. | 190/125 X |
| 5,065,847 | 11/1991 | Hsieh | 190/125 |
| 5,105,919 | 4/1992 | Bomes et al. | 190/18 A |

FOREIGN PATENT DOCUMENTS

| | | | |
|---|---|---|---|
| 2026 | of 1927 | Australia | 190/103 |
| 20989 | 2/1883 | Fed. Rep. of Germany | 190/103 |
| 285016 | 12/1990 | Fed. Rep. of Germany | 190/125 |
| 725576 | 5/1932 | France | 190/103 |
| 1557297 | 2/1969 | France | 190/103 |
| 2508288 | 12/1982 | France | 190/125 |
| 18192 | of 1892 | United Kingdom | 190/103 |
| 158755 | 2/1921 | United Kingdom | 190/127 |
| 225610 | 12/1924 | United Kingdom | 190/21 |
| 261923 | 12/1926 | United Kingdom | 190/103 |
| 588568 | 5/1947 | United Kingdom | 190/103 |
| 2173393 | 10/1986 | United Kingdom | 190/103 |

Primary Examiner—Sue A. Weaver

[57] ABSTRACT

A formed panel for a bag and method of manufacturing therefore is provided which allows the bag to maintain an original shape without deformation even though the bag may be acted on by external forces, and also allows the bag to appear soft from the outside thereof. The panel is formed from the impression of a fabric material onto a rigid plastic material. Also provided is a hard-sided, soft-gusseted luggage to protect the contents of the luggage without a totally rigid construction. A method of manufacturing a hard panel for luggage which includes impressing a fabric sheet onto a plastic sheet to form a combined sheet and molding the combined sheet to the desired shape.

14 Claims, 8 Drawing Sheets

SOFT GUSSET, HARD-PANELED LUGGAGE AND METHOD OF MANUFACTURE

RELATED APPLICATIONS

This application is a continuation-in-part application of pending U.S. application Ser. No. 07/702,950, filed May 20, 1991.

BACKGROUND OF THE INVENTION

1. Field of the Invention

The present invention relates to a formed panel for a bag and method of manufacturing therefore, and more particularly, to a formed panel for a bag and method of manufacturing therefore which allows the bag to maintain an original shape without deformation even though the bag may be acted on by external forces, and also allows the bag to appear soft from the outside thereof.

This invention also relates to luggage, and more particularly hard-sided, soft gusset luggage having durability and sufficient stiffness to protect the contents of the luggage without a totally rigid construction.

2. Description of Related Art

In general, when a bag is manufactured with the use of a panel formed by extruding Acrylic Buterate Styrene (ABS), Poly Vinyl Chloride (PVC), Poly Ethylene (PE), and Poly Propylene (PP), the bag is able to maintain an original shape without deformation by external force. Also, when a bag is made of material such as leather, vinyl, fabric or the like, it is easily deformable by external force.

According to the former case, it is possible to maintain the original shape of the bag, even if the bag is pressed by external forces. This results in the advantage that the contents of the bag can be maintained in their proper shape. Accordingly, this type of bag is generally used as a traveling bag, a bag for instruments, etc. Since the material of the formed panel is generally a hard plastic such a ABS, PVC, PE, PP, and so on, though the bag can be maintained in its original shape, it is a disadvantage that the outward appearance of the bag is unpleasant to the touch.

In the other case, where materials such as leather, vinyl, fabric or the like are used for manufacturing the bag, the outward appearance of the bag is agreeable to the touch, but when external force is applied to the flexible material, the force is directly transferred to the contents of the bag.

In order to overcome the disadvantage of the later case, it has been suggested that a structure with a square frame be inserted into the body of the bag to maintain a shape of the bag. While this structure maintains, partly, a square shape, it is incapable of maintaining the contents in the bag in their original form.

Soft-sided luggage has many advantages but also provides many problems which are inherent in its structure. Soft-sided luggage, normally referred to as luggage having a hard gusset or midsection and soft panels in front and back, must be filled full in order for the contents of the luggage and the front and back panels to be protected. If the luggage is not filled, voids occur which leave the soft front and back panels vulnerable to puncture or ripping. While such luggage is light in weight, it is bulky because of the stiffness and volume of the gusset. Additionally, the structure of soft-sided luggage requires rigid frames for closing the front panel to the gusset, which frames tend to bend because of the lack of strength of the front panel, leading to the bags often being bent and deformed.

Appearance problems also exist if the luggage is not carefully manufactured. If a hard gusset is used in the center section, then the hard section must be covered with the same soft material that is used to form the panels. If, on the other hand, the luggage is to have hard panels all around, then very often the panels are made of plastic and the entire luggage tends to appear cheap and shoddy. If cloth is used in the luggage, then the luggage will have a soft appearance and will in fact be soft in the front and back panels and require separate structural stiffeners.

Additionally, flexible or soft-sided luggage is not necessarily expandable even though the sides are soft. Since the luggage must be relatively full in order to keep the sides from becoming vulnerable to puncture or ripping, it is necessary that the soft-sided luggage be very accurately sized to the load involved. Attempts have been made in the past to expand the luggage in accordance with the size of the load being carried but these attempts have been less than successful. Furthermore, none of these patents, taken either singly or in combination, are thought to provide the benefits of the present invention.

Trotter, U.S. Pat. No. 1,171,678, shows a rigid piece of luggage having an expandable side panel by placing flexible sheet within the remainder of the luggage and strapping the two together.

Switkes, U.S. Pat. No. 1,889,765, shows a bellows expansion panel for the outside of an attache case.

Gray, U.S. Pat. No. 2,536,169, shows a device having two zippered halves connected by a zipper, so that the middle of the apparatus is flexible while the outer panels are relatively stiff. Provisions are made for inserting zip and expansion panels into the device to make the device of larger capacity.

Miller, U.S. Pat. No. 3,061,057, is a device which has add on segments zipped together to a soft, flexible center.

Dyke, U.S. Pat. No. 3,443,671, shows an expansible carrying case having asymmetrically opening zippered pleats to enable expansion.

Kotkins, Jr., U.S. Pat. No. 4,773,515, shows a device having zip on expansion chambers at the ends of the device.

The related art does not provide the essential elements or benefits of the present invention.

SUMMARY OF THE INVENTION

In order to overcome the problems of the prior patents, the present invention sets forth a light weight soft luggage having hard protective panels on the front and back sides which are attached to a fabric gusset section The flexibility of the fabric in the gusset section allows for the hard front and back panels to orient themselves with respect to the loading of the contents in the luggage and allows for collapsing of the luggage when empty and enables expansion of the luggage when necessary.

Additionally the present invention sets forth a method of manufacturing luggage in which hard front and back panels are formed by molding plastic and a cloth cover to form the external surface of the panel. The rear panel is then sewn to a cloth gusset section using standard welting technology. The front panel has a hinge section sewn to it and the front of the gusset section and has a mating zipper sewn to the remaining edges of the front panel and the front portion of the gusset. A metal stiffening band is mounted in the gusset and the luggage handle is fastened through the gusset to the stiffening band.

According to an embodiment of the present invention, raw material is adhesively deposited on a resin panel and the resultant composition is heated for 30 to 50 seconds at 120° C. to 140° C. After the heating process has been completed, the resultant composition is extruded and formed by using a metal molding press, the formed product is cooled and then the scrap is removed from the formed product to obtain the formed panel.

In forming of the formed panel according to another embodiment of the present invention, raw material such as fabric, vinyl or the like is adhesively deposited on a resin panel which is extracted from an injection molding machine and the resultant structure is extruded so that the raw material can be deposited on the resin panel. After that, a cooling and carrying process is performed on the resultant structure and the resultant formed product is cut to predetermined lengths through a cutting process.

According to the first embodiment of the method as described above, when leather or patterned fabric is used as a raw material, it will be apparent that an advantage that is provided is that a worker can directly align the patterns on fabrics or the connecting parts of leather.

Further, in case of the second embodiment of the method as described above, since the raw material is directly deposited on the resin panel and then the extruding process performed, mass production may be achieved.

Accordingly, it is an object of the present invention to provide a luggage constructed with a flexible gusset section and relatively rigid front and back panels, which piece of luggage is light in weight.

It is an object of the present invention to provide a formed panel for a bag and method of manufacturing therefore in which a raw material such as fabric, leather, vinyl or the like is adhesively deposited on a resin panel which is extruded to form a basic panel for a bag, so that the bag provides a soft feel in its outward appearance, while not permitting deformation even though external forces are applied.

It is also an object of the present invention to provide a luggage constructed with a flexible gusset section and relatively rigid front and back panels, which piece of luggage is durable.

It is another object of the present invention to provide a luggage constructed with a flexible gusset section and relatively rigid front and back panels, which piece of luggage is strong.

It is even another object of the present invention to provide a luggage constructed with a flexible gusset section and relatively rigid front and back panels, which piece of luggage is inexpensive to fabricate.

Even another object of the present invention to provide a luggage constructed with a flexible gusset section and relatively rigid front and back panels, which piece of luggage is expandable beyond its normal size when full.

Yet another object of the present invention to provide a luggage constructed with a flexible gusset section and relatively rigid front and back panels, which piece of luggage is collapsible when empty.

Still another object of the present invention to provide a luggage constructed with a flexible gusset section and relatively rigid front and back panels, which piece of luggage is flexible.

A further object of the present invention to provide a luggage constructed with a flexible gusset section and relatively rigid front and back panels, which piece of luggage has few complex parts and is of simplified construction.

Even a further object of the present invention to provide a luggage constructed with a flexible gusset section and relatively rigid front and back panels, which piece of luggage has a simplified construction that allows for simplified assembly.

An additional object of the present invention to provide a luggage constructed with a flexible gusset section and relatively rigid front and back panels, which piece of luggage allows for the components thereof to be sewn to form the entire luggage and which allows for the luggage to be opened and closed by means of a zipper.

Another object of the present invention to provide a luggage constructed with a flexible gusset section and relatively rigid front and back panels, which piece of luggage has a zipper closure with hard side advantages.

Even another object of the present invention to provide a luggage constructed with a flexible gusset section and relatively rigid front and back panels, which piece of luggage is impervious to the crushing of the contents or the puncture or ripping of the front and back panels.

Yet another object of the present invention to provide a luggage constructed with a flexible gusset section and relatively rigid front and back panels, which piece of luggage has a strong handle.

Still another object of the present invention to provide a luggage constructed with a flexible gusset section and relatively rigid front and back panels, which piece of luggage which is hard sided with the major components thereof sewn together.

It is also an object of the present invention to provide a luggage constructed with a flexible gusset section and relatively rigid front and back panels, which piece of luggage is cloth covered and has rigid front panels and back panels, and a flexible central section.

Additionally it is an object of the present invention to provide a luggage constructed with a flexible gusset section and relatively rigid front and back panels, which piece of luggage does not require external or internal stiffening sections for the front and rear panels.

It is also is an object of the present invention to provide a method for manufacturing and assembling an article of luggage having rigid front and back panels with a simplified method of construction.

It is another object of the present invention to provide a method for manufacturing and assembling an article of luggage which molds cloth to plastic to form hard front and back panels that have cloth surfaces for durability and an attractive appearance.

It is still another object of the present invention to provide a method for manufacturing and assembling an article of luggage which allows for the sewing together of the major components.

It is yet another object of the present invention to provide a method for manufacturing and assembling an article of luggage which allows for zipper closure thereof.

It is a further object of the present invention to provide a method for manufacturing and assembling an article of luggage which is sequenced for ease of assembly.

It is even a further object of the present invention to provide a method for manufacturing and assembling an article of luggage which is sequenced for inexpensiveness in the cost of assembly.

It is still a further object of the present invention to provide a method for manufacturing and assembling an article of luggage which does not require precision parts for the assembly thereof.

These, as well as further objects and advantages of this invention will become apparent to those skilled in the art from a review of the accompanying Detailed Description of the Preferred Embodiments, reference being made to the accompanying drawings.

DESCRIPTION OF THE PREFERRED EMBODIMENTS

The preferred embodiments of the present invention will be now described with reference to the accompanying drawings.

First Embodiment

Figure 1:
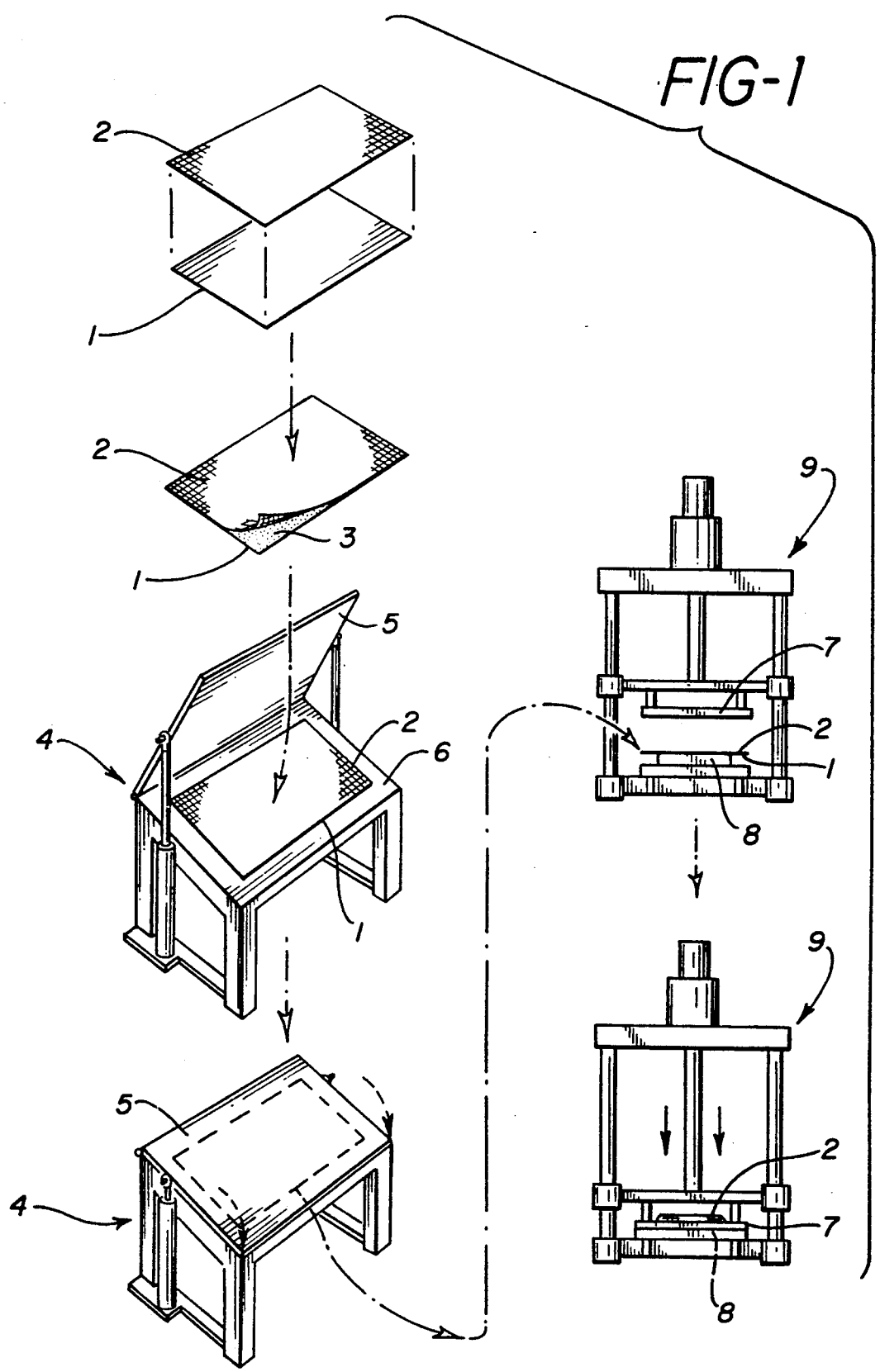
FIG. 1 is a view illustrating a processing sequence of a first embodiment according to the present invention.
Figure 2:
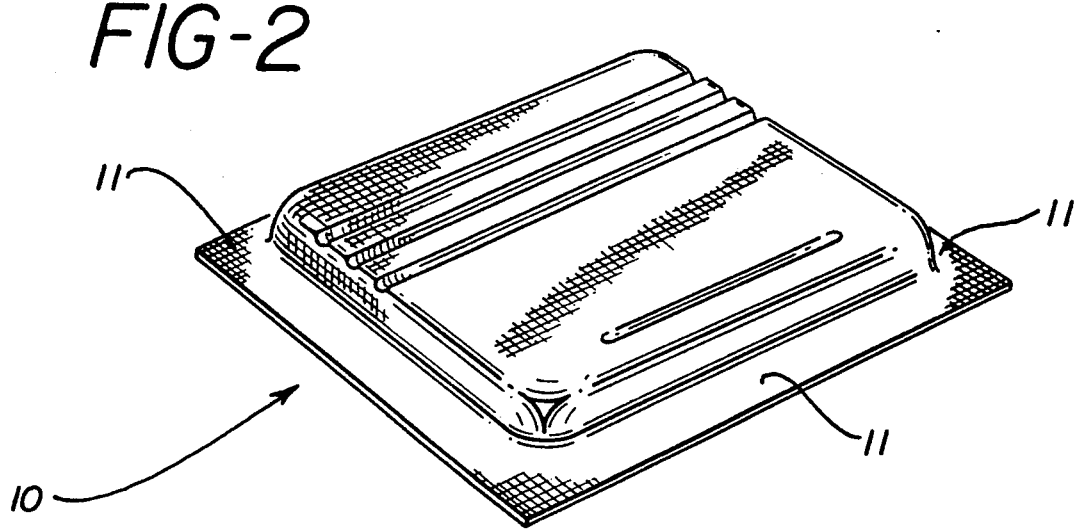
FIG. 2 is a perspective view of a formed product according to the present invention.

Referring to FIG. 1, a resin panel 1 is preferably made of a material such as Acrylic Buterate Styrene (ABS), Poly Ethylene (PE), and Propylene (PP) and pack, which are hard and partly contained components of rubber. A flexible material, such as fabric, leather, vinyl or the like, is used as a raw material to be deposited on the resin panel.

In this embodiment, an adhesive agent 3 is coated on the resin panel 1, the panel 1 is cut to a predetermined size and the raw material 2 is then adhesively deposited on the resin panel 1.

Next, the resin panel 1 and raw material 2 composition, is loaded into press 4, on the upper side of a heating plate of press 4 and then the resin panel 1 is pressed by a pressing plate 5. During this operation, the temperature of the pressing plate 5 and the upper side 6 of the heating plate and press 4 are all preferably between 120° C. and 140° C. and the pressing time is approximately 30 to 50 seconds.

Next, the heat-processed resin panel 1 is formed by the molding press 9, typically a plug-molding press. The molding press includes an upper metal molder 7 and a lower metal molder 8. Preferably, the upper and lower molders 7 and 8 are replaceable and are shaped as male and female components to correspond to the shape of the panel for the bag to be formed.

Accordingly, the flexible resin panel 1, with the raw material 2 adhered thereto, is passed through the heating plate and press 4, 5 is loaded on the lower metal molder 8 of the molding press 9 and then the resin panel 1 is extruded and formed by applying the upper metal molder 7, thereto.

Figure 3:
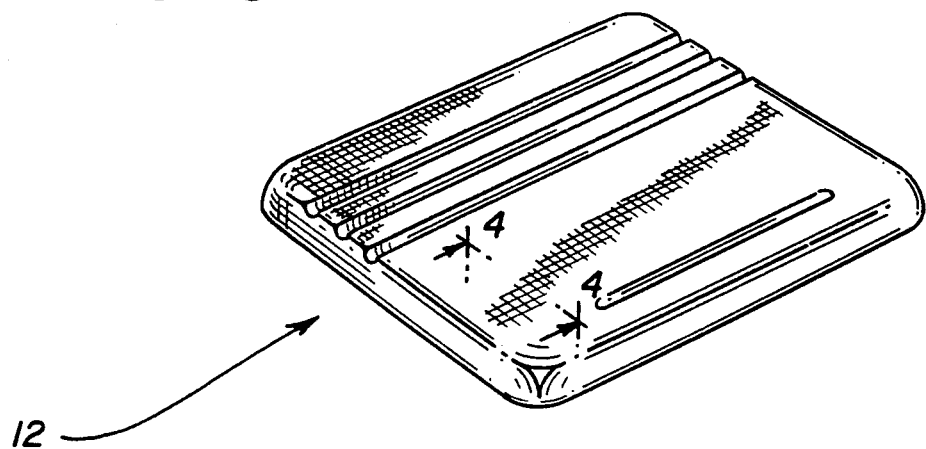
FIG. 3 is a perspective view of a formed panel with the scrap cut away from the product of the present invention.

The resultant formed product 10 is cooled by a cooling apparatus, not shown, and the scrap 11 about the periphery of the resin panel 1 is cut off to thereby obtain the formed panel 12 as shown in FIG. 3.

Figure 4:
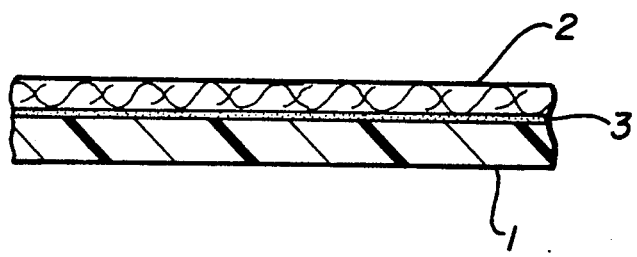
FIG. 4 is an enlarged, vertical, cross-sectional view of a formed panel of the present invention as taken along line 4—4 of FIG. 3.

The formed panel 12 is, by means of the extruding and forming process, as shown in FIG. 4, integrally coated with the flexible raw material 2 such as fabric or leather, while the inner surface is coated with a hard material such as ABS, PE, PP, to provide the panel with a soft feel at the outside thereof and with rigidity against external forces.

Figure 5:
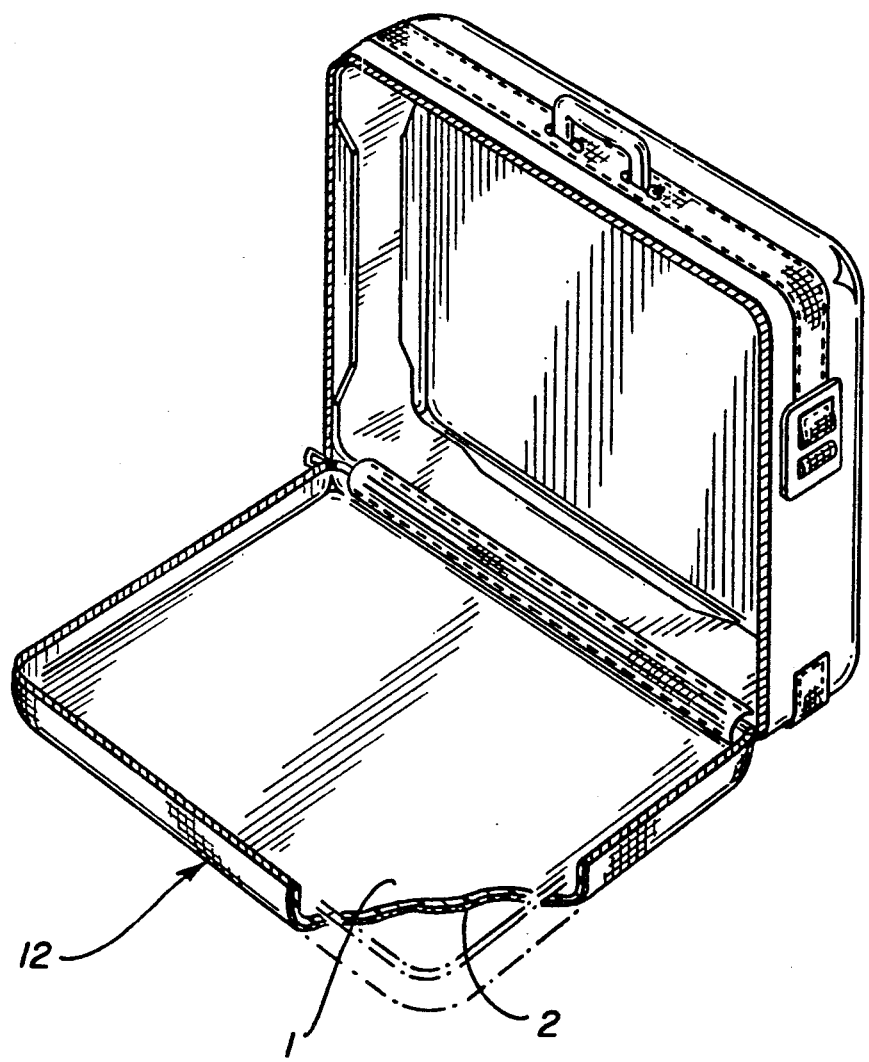
FIG. 5 is a perspective view illustrating an actual application of a formed panel according to the present invention.

Accordingly, if the panel is used for manufacturing a traveling bag, as shown in FIG. 5, additional accessories may be attached to the bag without departing from the spirit or scope of this invention, nor without relinquishing the advantages of the invention.

The present invention is not limited to a traveling bag. It will be apparent that the present invention can be adapted for use in manufacturing various kinds of bags, such as a bag for instruments, gun cases, wash implement bags, sports bags, camera bags, etc.

Second Embodiment

Figure 6:
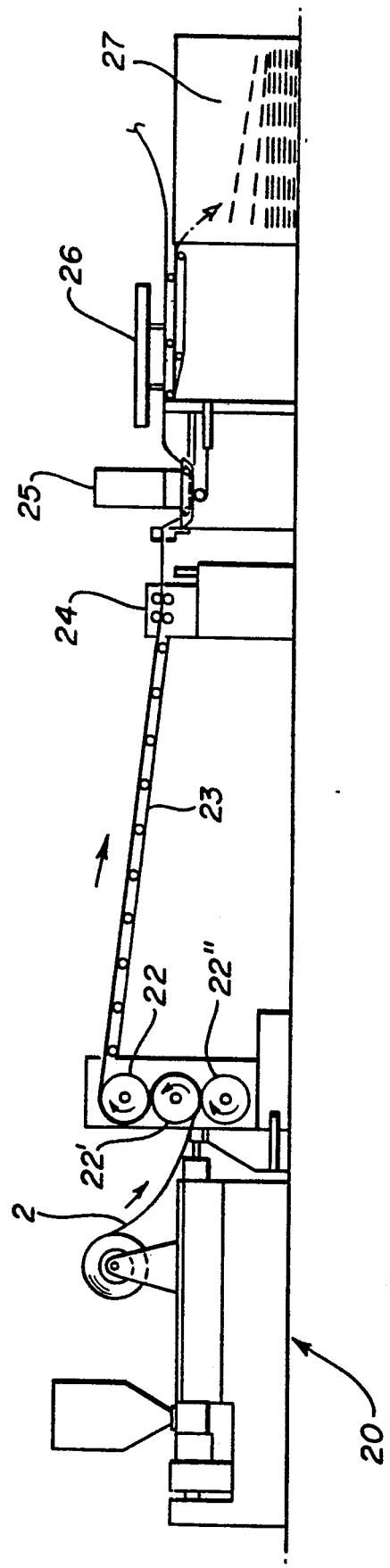
FIG. 6 is a manufacturing process view illustrating a second embodiment of the present invention.

FIG. 6 shows an alternative system in which the raw material 2 is applied and adhered to the resin panel 1 during the resin extruding process, to thereby allow mass production to be achieved.

More particularly, the first embodiment as described above can be adapted to position or align the raw material when it contains patterns which must be aligned when the raw material is leather, whereas the second embodiment allows the raw material to be sequentially adhered to the resin panel.

Referring to FIG. 6, the raw material is supplied into a hopper of the extruder 20 and a scrolled raw material is put into contact with the resin panel extruding from the extruder 20. The raw material is adhered to the resin panel by passing the two components, together, through a plurality of guide rollers 22, 22' and 22''.

Next, the resultant composition is transferred through a cooling carrying conveyer 23 and a preserving unit 24 to a cutter 25, which automatically cuts the composition to predetermined lengths. The cut panels are guided by a carrying conveyer 26 to a store room 27.

According to this embodiment, a special adhesive agent is unnecessary for attaching the raw material to the resin panel 1 as shown in FIG. 4.

The panels stored in the store room 27 are cut down to the desired shape. The panels may then be used as shown in FIG. 5 as a side panel.

Alternatively, the present invention contemplates the formation of the shape of the panel by vacuum-molding the resin panel and the raw material.

As described above, this invention provides a formed panel for a bag which allows the bag to maintain its original shape and resist deformation from pressure by the application of external forces, while still feeling soft in its outward appearance. This invention has uses with many different types of bags including traveling bags, wash implement bags, camera bags, etc.

Figure 7:
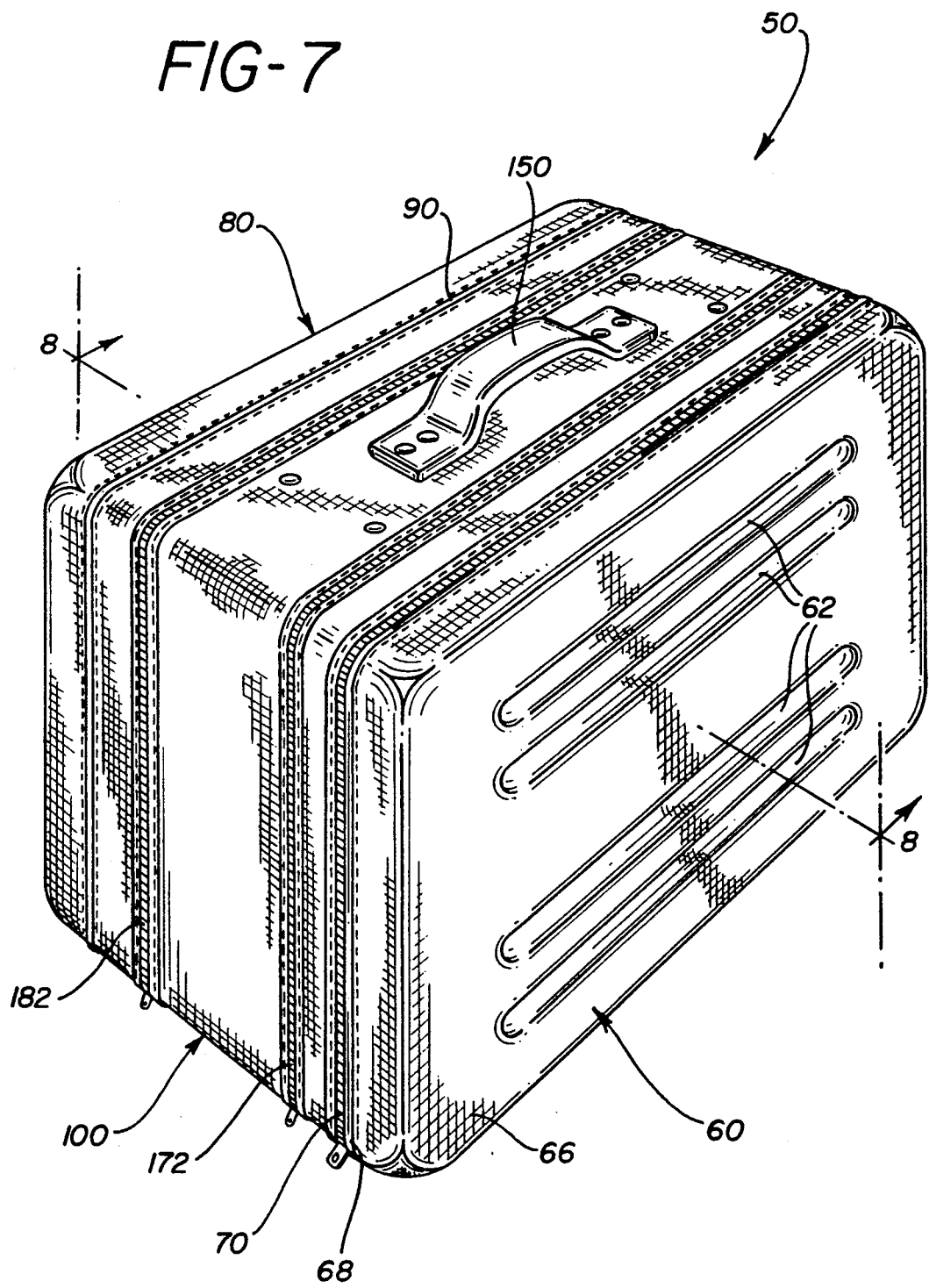
FIG. 7 is a perspective view of an embodiment of the luggage of the present invention.

Referring to FIG. 7, a piece of luggage generally indicated at 50 as shown, having a front panel generally indicated at 60 and a rear panel generally indicated at 80 connected to a central soft gusset section generally indicated at 100. The front panel has several stiffening ribs 62 molded into it to add rigidity to it. Stiffening ribs 82 are also present in the rear panel. The front panel is connected to the gusset section 100 by means of a zipper closure 70 which is used to close and open the luggage. It can be of any conventional type, as shown. It may have one or two slides depending on the choice of the designer.

The rear panel 80 is connected to the central gusset section by means of welting 90, as will be explained in greater detail hereinafter. A handle 150, is connected to the top of the luggage in a manner also to be described.

Figure 8:
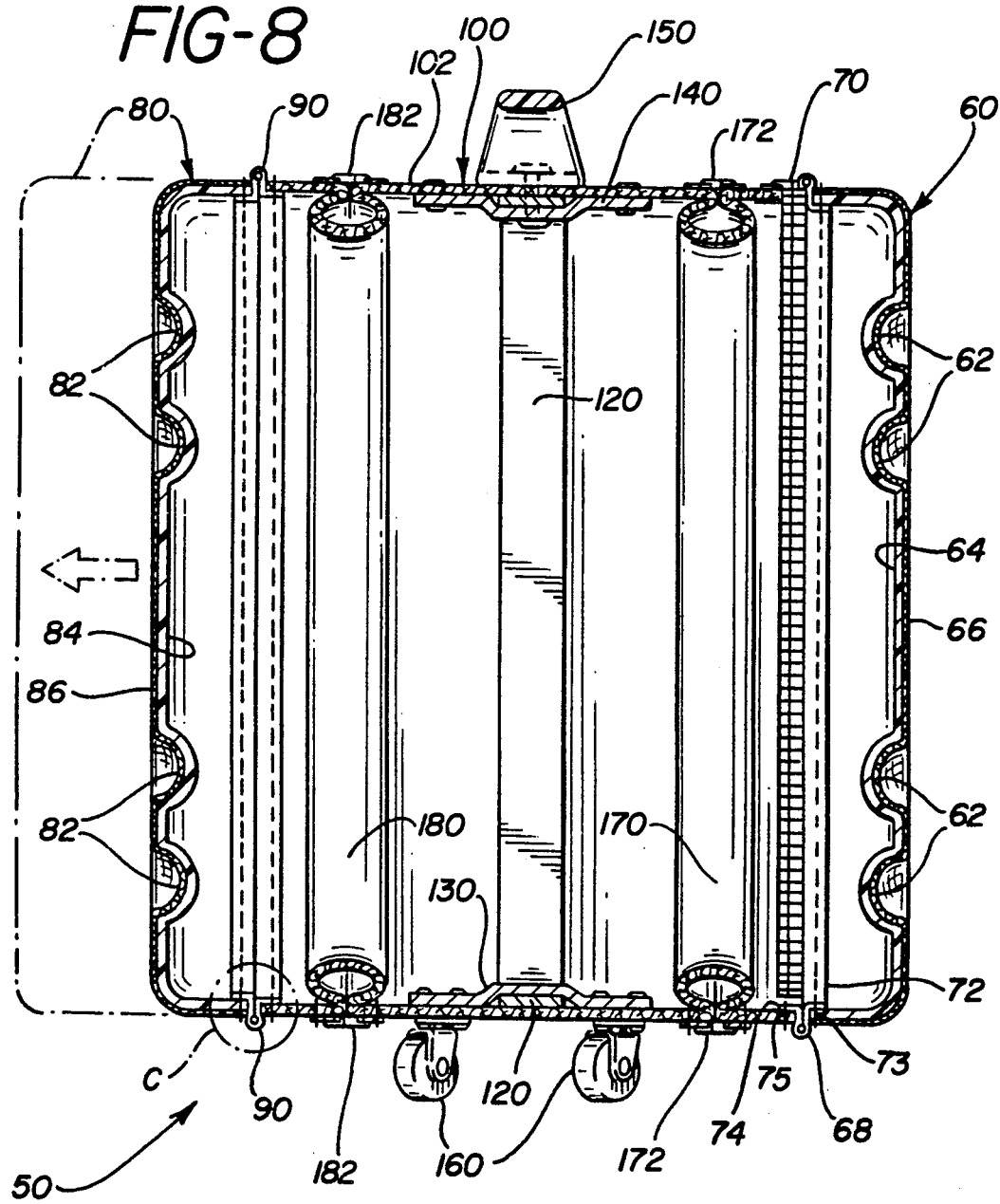
FIG. 8 is a cross-sectional view of an embodiment of the luggage of the present invention as taken along line 8—8 of FIG. 7.
Figure 9:
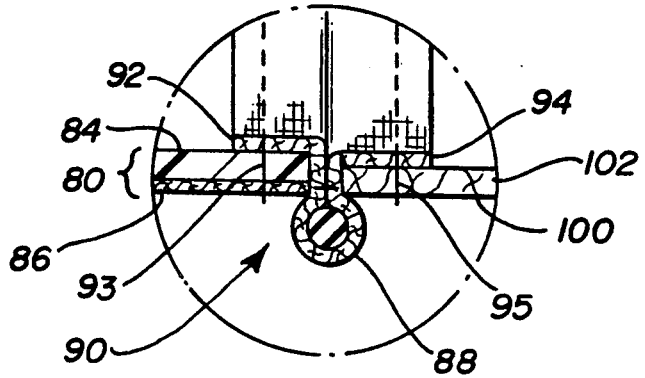
FIG. 9 is an enlarged view of Portion C of FIG. 8.

Referring to FIGS. 8 and 9, the front panel is made of an inner hard-plastic shell 64, by the method previously described and has a cloth outer surface 66. Welting 68 joins the front cover 60 to the gusset 100 by conventional means, namely with leg 72 being sewn by threads 73 to the front panel 60 and by threads 75 which sew together the gusset 100 and the other leg 74 of the welting.

The zipper 70 is sewn to the gusset 100 and to the front panel 60 in a standard conventional manner.

The rear panel 80 is of the same shape and form as the front panel 60. It has stiffening ribs 82 and includes a hard inner panel 84 with a molded cloth outer surface 86.

Welting 88 connects the rear panel 80 to the rear of the gusset section 100 in the same manner as the welting 68 connects the front panel 60 to the gusset section 100, i.e. welting 88 includes a panel leg 92 and a gusset leg 94 which are sewn to the back panel and the gusset by threads 93 and 95 respectively.

Gusset section 100 is relatively flexible and is typically made of a soft material 102 such as cloth or other durable material which allows it to flex or fold. The gusset section has a stiffening bar 120 which is a continuous metal bar that extends completely around the gusset, contacting the inside top and bottom and side surfaces of the gusset to give the gusset some shape and to act as a support for the handle 150 which is connected thereto, to support the luggage via a top plate 140 which acts to reinforce the fastening means.

A bottom plate 130 is also provided to add sufficient rigidity to the bottom of the gusset section to prevent the gusset section from collapsing. Bottom plate 130 is connected, in turn, to the stiffening bar 120.

The bottom plate can be used for the fastening wheels 160 thereto, if desired. The wheels can be attachable or detachable as desired.

As can be seen, by having a soft and flexible gusset section of the middle of the luggage, the front and back panels 60 and 80 are free to move and to basically conform the gusset section around the load contained in the luggage. The contents of the luggage will be protected by the front and back panels and application of an external force to the panels will not cause any source of stress concentration on the luggage contents, as the panels are free to move because of the flexibility of the gusset section. Therefore, any sharp impacts against the panels will be resisted by the panels and the panels will act to distribute the load among the internal contents of the luggage.

Additionally, as shown in FIG. 8, the gusset section has two expansion darts 170 and 180 respectively. Dart 170 is in the front portion of the gusset and dart 180 is in the rear portion of the gusset. The expansion darts are closed, typically, by zippers 172 and 182 respectively which are formed on the edges of the darts and which are continuous around the circumference of the gusset section. Note that the darts are disposed beyond the edges of the bottom plate 130. Opening the darts allows the gusset section to expand, if necessary, to increase the volume of the luggage. When the need for the larger luggage no longer exists, the darts can be closed to shrink the size of the luggage.

Other Embodiments of the Invention

Figure 10:
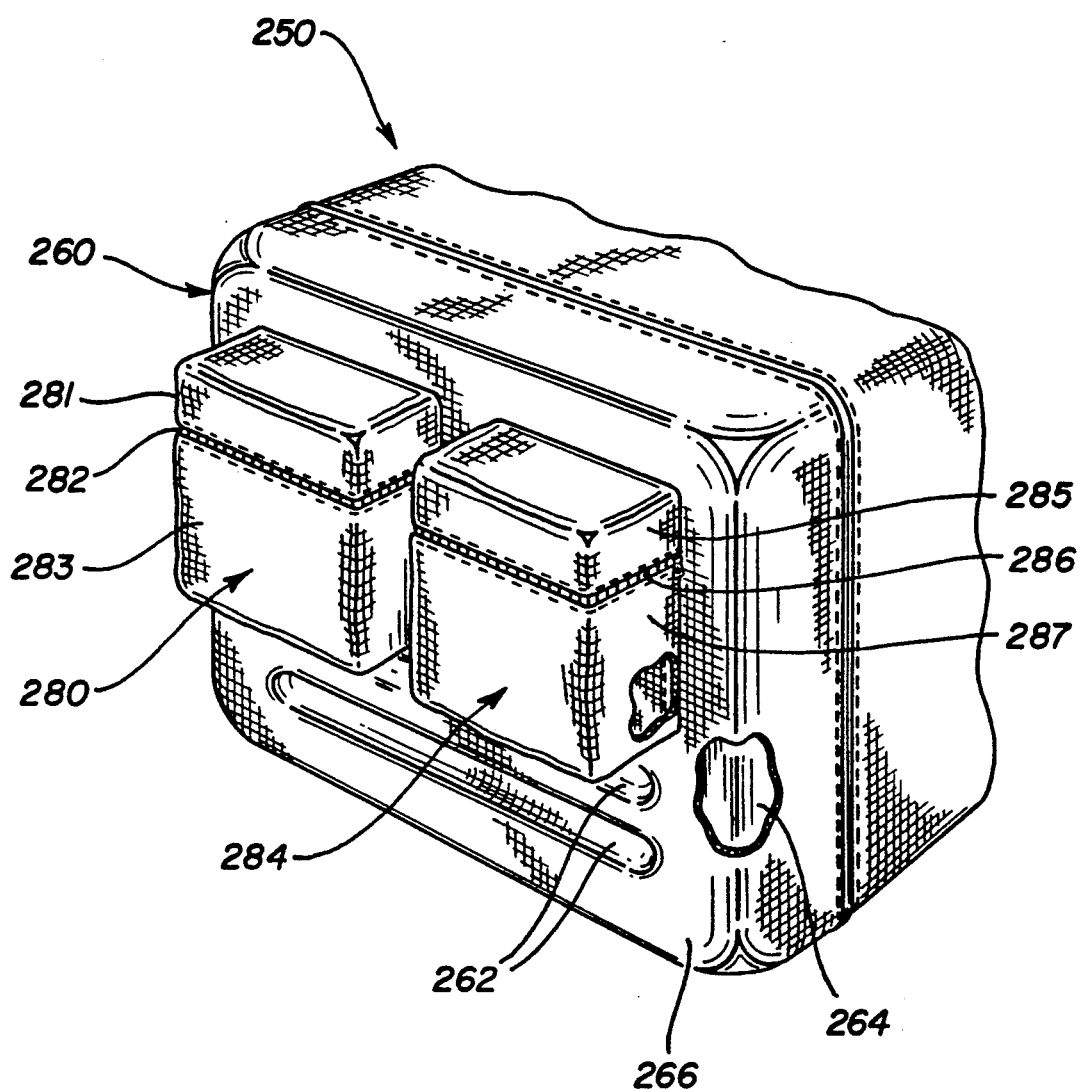
FIG. 10 is a perspective view of another embodiment of the luggage of the present invention.

In another embodiment of the invention, as shown in FIG. 10, the hard outer panels can have separate pockets sewn to them. In FIG. 10, a front panel 260 of luggage, generally indicated at 250, has stiffening ribs 262 molded thereon with the front panel 260 being formed from a hard inner panel 264 having a cloth outer covering 266 in the same manner as previously described.

In this embodiment, attached to the outer cloth panel 266 are pockets generally indicated at 280 and 284, which pockets have upper and lower sections 281 and 283 which sections are connected by a zipper 282. Pocket 284 has upper portion 285 and 287 connected by zipper 286. The pockets are formed by sewing them to the outer fabric cover 266 prior to the molding of the cover to the hard inner panel 264. The pockets could, however, be stitched directly through the hard plastic layer. Importantly, the panel is sufficiently rigid to support the pockets and maintain their shape when they are fully loaded.

Figure 11:
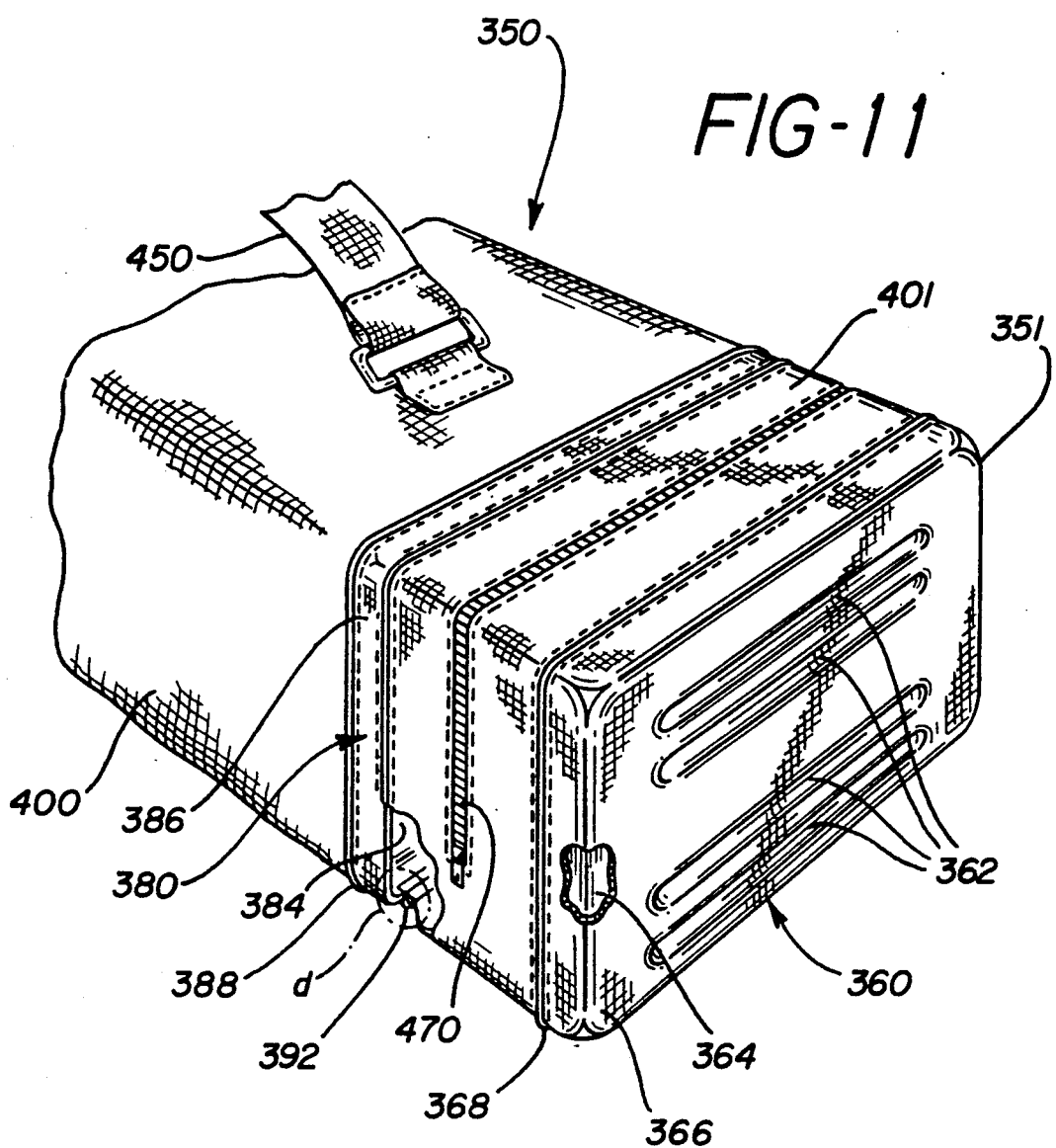
FIG. 11 is a perspective view of another embodiment of the luggage of the present invention.

FIG. 11 shows another embodiment of the invention, wherein luggage, generally indicated at 350 has a soft central section 400 with a handle 450.

The luggage has one or more hard panels constructed by the method previously described. Shown in this embodiment of the invention are two hard panels, although it should be understood that the outermost panel could be soft rather than hard. The hard panel generally indicated at 360 has stiffening ribs 362 and it is formed from a hard inner shell 364 with a cloth outer covering 366. Welting 368 connects the outer panel 360 to the soft, inner gusset-like section 401. A zipper generally indicated at 470 is used to close the outer or the extreme container generally indicated at 351.

Figure 12:
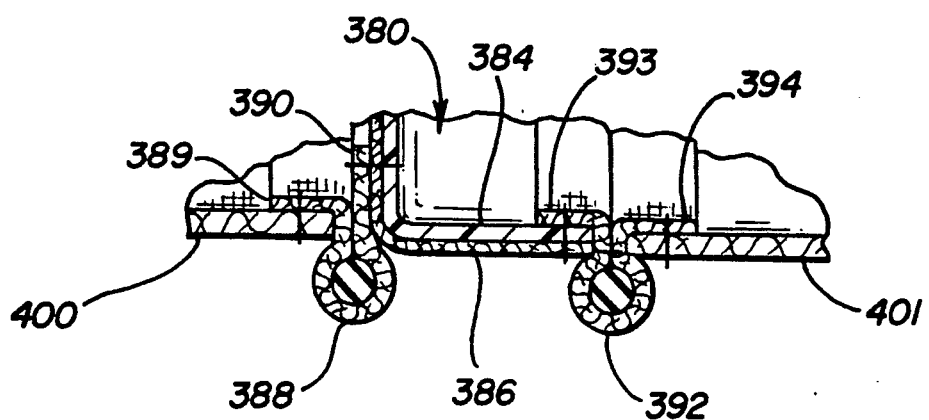
FIG. 12 is an enlarged view of Portion D of FIG. 11.

The rear panel is, preferably, also a hard panel as shown in the broken away portion D of this figure. This panel is somewhat different from the rear panel of the embodiments previously described in that it is relatively flat and joined at two ends, as shown in FIG. 12, with a double row of welting in which the rear panel generally indicated at 380 includes inner hard panel 384 with the outer soft portion 386. The rear panel is connected to the bag 400 by means of welting wherein welting 388 has legs 389 and 390 which are connected to the fabric of the bag 400 and the hard panel 380, respectively, by means of stitching, and a second welting 392 that has one leg 393 connected to the hard panel 380 and the other leg 394 connected to the inner gusset-like section 401 of the end container.

The same basic principles of the luggage apply to this embodiment in that there is a soft gusset that allows for movement of the hard panels to conform around the contents of the luggage and to thereby protect the contents by distributing any externally applied load among the contents.

Having thus described my invention in detail, it is to be understood that the foregoing description is not intended to limit the spirit and scope thereof. What is desired to be protected by Letters Patent is set forth in the appended claims.

What is claimed is:

1. Deformable luggage with non-deformable external panels comprising:
    a gusset section extending above the center of the luggage, the gusset section having a top side and a bottom side and a front edge and a back edge, the gusset section formed from a cloth web;
    a plurality of zippers fastened to the cloth web, each zipper having mating sides, the sides fastened to the cloth web in a spaced-apart relationship, the sides extending continuously around the gusset section to gather the cloth web and form a continuous seam when the zipper is engaged and to enable expansion of the gusset section when the zipper is fully opened;
    a stiffening bar disposed within and extending about the gusset section;
    a bottom plate fastened to the bottom side of the gusset section and to the stiffening bar to support the stiffening bar and to stiffen the bottom side of the gusset section;
    a plurality of wheels disposed on the bottom side of the gusset section beneath the bottom plate;
    connecting means connecting the wheels to the bottom plate through the gusset section to connect the wheels to the bottom plate and the gusset section so that the wheels can support the luggage;
    a top plate connected to the top of the stiffening bar;
    a handle disposed at the top side of the gusset section;
    connecting means connecting the handle to the gusset section, the top plate and the stiffening bar to enable the handle to support the luggage;
    a back panel comprising:
    a sheet of rigid plastic material;
    a sheet of fabric impressed onto the sheet of rigid plastic material forming a combined material, the combined material molded to form a convex panel having front, back, top and bottom ends and a large planar section, the planar section having a plurality of stiffening ribs molded therein, the ends of the back panel being connected to the back edge of the gusset section by connecting means comprising:
    a welting bead having a core member, a panel leg and a gusset leg, the panel leg being connected to the back panel by thread means, and the gusset leg being connected to the back edge of the gusset section by thread means;
    a front panel comprising:
    a sheet of rigid plastic material;
    a sheet of fabric impressed onto the sheet of rigid plastic material forming a combined material, the combined material molded to form a convex panel having front, back, top and bottom ends and a large planar section, the planar section having a plurality of stiffening ribs molded therein, the ends of the front panel being connected to the front edge of the gusset section by connecting means comprising:
    a welting bead having a core member, a panel leg and a gusset leg, the panel leg being connected to the front panel by thread means, and the gusset leg being connected to the front edge of the gusset section by thread means, the welting bead extending along the bottom side of the gusset section and the bottom end of the front panel to form a hinge means to allow the front panel to open pivotally from the luggage to permit access to the contents of the luggage;
    a zipper securing the front panel to the gusset section, the zipper extending along the top, front and back ends of the front panel at a position adjacent to the welting bead along the bottom end of the front panel, the zipper having two halves, the first half of the zipper connected to the front edge of the gusset section and the second half of the zipper connected to the top, front and back ends of the front panel so that closure of the of the zipper secures the front panel to the gusset section.

2. Deformable luggage having a top, bottom, front and back ends and hard panels comprising:
    a flexible gusset extending about the center of the luggage, the gusset having a top side and a bottom side;
    a plurality of zippers, each zipper having mating sides fastened in a spaced-apart relationship to the flexible gusset, each of the plurality of zippers extending continuously around the flexible gusset to form a continuous seam when the zipper is engaged and to enable expansion of the flexible gusset when the zipper is fully opened;
    stiffening means disposed within the flexible gusset to form a continuous band within the gusset;
    a handle disposed on the top external surface of the flexible guest;
    connecting means connecting the handle to the stiffening means within the gusset to support the luggage;
    a rigid back panel;
    connecting means connecting the rigid back panel to the flexible gusset to secure the back panel to the flexible gusset;
    a rigid front panel having top, bottom, front and back edges;
    hinge means connecting the rigid front panel to the flexible gusset to pivotally connect the front panel to the flexible gusset; and
    securing means to releasibly secure the front panel to the flexible gusset.

3. The apparatus of claim 2 wherein the means for connecting the rigid back panel to the flexible gusset comprises a welting bead having a core member, a panel leg and a gusset leg, the panel leg being connected to the back panel by thread means, the gusset leg being connected to the flexible gusset by thread means, the welting bead extending about the top, bottom, front and back ends of the luggage.

4. The apparatus of claim 2 wherein the hinge means comprises a welting bead having a core member, a panel leg and a gusset leg, the panel leg being connected to the front panel by thread means, the gusset leg being connected to the flexible gusset by thread means, the welting bead extending along the bottom of the flexible gusset and the rigid front panel to form the hinge means to allow the front panel to open pivotally from the luggage to allow access to the contents of the luggage.

5. The apparatus of claim 4 wherein the securing means comprises a zipper securing the front panel to the flexible gusset, a zipper extending about the top, front and back edges, of the front panel, the zipper having two halves, the first half of the zipper connected to the flexible gusset and the second half of the zipper connected to the top, front and back edges of the front panel so that closure of the zipper secures the front panel to the flexible gusset.

6. The apparatus of claim 2 wherein the rigid back panel comprises:
   a sheet of rigid plastic material;
   a sheet of fabric impressed onto the sheet of rigid plastic forming a combined material, the combined material molded together to form a convex panel having front and back and top and bottom edges and a large planar section, the planar section having a plurality of stiffening ribs molded therein.

7. The apparatus of claim 6 wherein the rigid front panel comprises:
   a sheet of rigid plastic material;
   a sheet of fabric impressed onto the sheet of rigid plastic forming a combined material, the combined material molded together to form a convex panel having side front and back and top and bottom edges and a large planar section, the planar section having a plurality of stiffening ribs molded therein.

8. The apparatus of claim 7 wherein the rigid plastic material of the front and back panels is formed of Acrylic Butyrate.

9. The apparatus of claim 7 wherein the rigid plastic material of the front and back panels is formed of Styrene.

10. The apparatus of claim 7 wherein the rigid plastic material of the front and back panels is formed of Poly Vinyl Chloride.

11. The apparatus of claim 7 wherein the rigid plastic material of the front and back panels is formed of Poly Ethylene.

12. The apparatus of claim 7 wherein the rigid plastic material of the front and back panels is formed of Poly Propylene.

13. The apparatus of claim 2 further comprising a bottom plate fastened to the bottom side of the flexible gusset and to the stiffening means to support the stiffening means and to stiffen the bottom side of the flexible gusset.

14. The apparatus of claim 13 further comprising wheels disposed on the bottom side of the flexible gusset and beneath the bottom plate, and connecting means connecting the wheels to the bottom plate through the flexible gusset to connect the wheels to the bottom plate and the flexible gusset so that the wheels can support the luggage.

* * * * *